Nov. 30, 1965 — J. H. GILTZOW — 3,220,296

MUSIC TEACHING DEVICE

Filed July 28, 1964

INVENTOR.
JAMES H GILTZOW

BY Darby + Darby

ATTORNEYS

United States Patent Office 3,220,296
Patented Nov. 30, 1965

3,220,296
MUSIC TEACHING DEVICE
James H. Giltzow, 89 Eagle Rock Ave., Roseland, N.J.
Filed July 28, 1964, Ser. No. 385,683
5 Claims. (Cl. 84—480)

This invention relates generally to devices for teaching music and more particularly relates to a device for assisting beginners in playing organs, piano, accordion, and the like.

Many methods have been utilized in attempting to orient individual notes with a keyboard, without great success. These methods required intensive study to translate the individual notes from charts or equipment into responsive chords used in playing the keyboard of a piano, organ, accordion or the like. These prior art devices also tended to confuse beginners and tended to discourage all but the most determined potential players.

Accordingly, it is an object of the present invention to provide a device for teaching chord-groupings to beginning players.

Another object of the present invention is to provide a teaching device for use by beginning players of piano, organ, accordion or the like, which has an index of chords to show the placement of fingers on the keyboard for forming the desired chords through changing pictorial illustrations.

A still further object of the present invention is to provide a teaching device that accomplishes all of the above, which is easy to use, requires little technical background or experience, is compact, inexpensive to make and versatile in application.

Further objects of this invention will be more apparent to those skilled in the art from a consideration of the specification and the accompanying drawing, in which.

Figure 1:
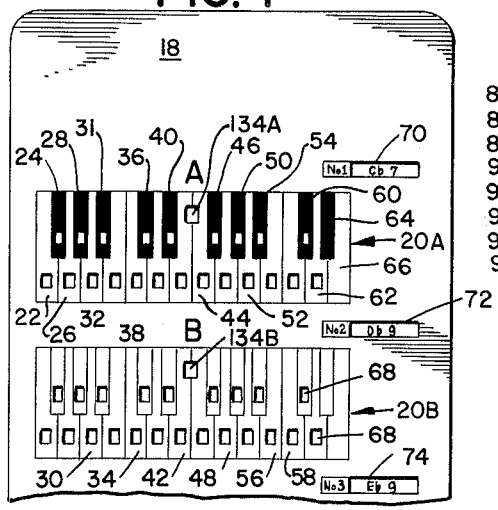
FIGURE 1 is a fragmented top plan view of one face of the present invention, with the slider partially extended.

Referring now to the drawings, the present invention is comprised of a sheath 12 within which is slidably disposed a sliding member or slider 14.

Figure 3:
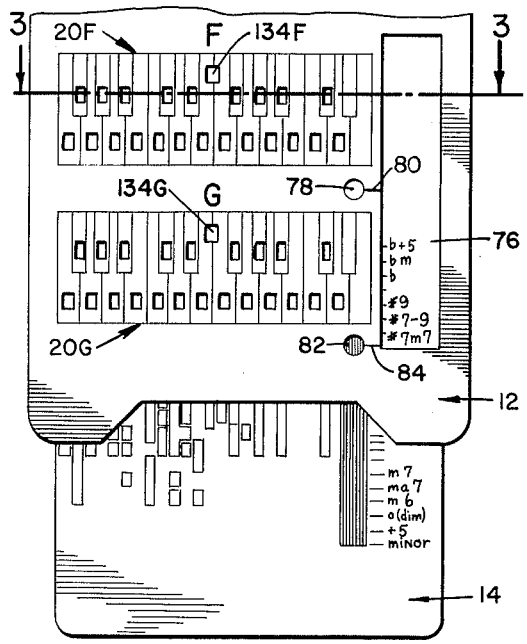
FIGURE 3 is a cross-sectional view taken along line 3—3 of FIGURE 1.

Considering sheath 12 in more detail, it is seen in FIGURE 3 that sheath 12 has a pair of panels 16 and 18 which are back to back and held together along their longitudinal edges in any convenient manner, such as by rivets, staples, adhesive tapes, or the like, so as to leave a space within which sliding member 14 can move. If desired, sheath 12 may be of one piece and folded along one longitudinal edge. Advantageously, panels 16 and 18 are identical and while only panel 18 is described and shown in detail, it is understood that the description with respect to panel 18 supplies also to panel 16, where similar numerals primed are used to identify similar parts.

The outer surfaces of panels 16 and 18 are constructed identically with each outer surface having a plurality of spaced apart, vertically aligned keyboard diagrams 20 thereon. As illustrated, seven (7) keyboards, 20A through 20G, are shown. Each keyboard diagram 20 is identified on panel 18 with its own letter, with the top keyboard diagram being identified as "A," the next lowermost keyboard diagram 20 being identified as "B" and continuing downwardly through the alphabet to the lowermost keyboard diagram, which as shown is identified as "20G."

As shown, each of keyboard diagrams 20A through 20G is provided with 24 conventional keys, 22, 24, 26, 28, 30, 31, 32, 34, . . . 62, 64 and 66, which covers about two octaves. Each keyboard diagram, 20A through 20G has 14 white keys, 22, 26, 30, 32, 34, 38, 42, 44, 48, 52, 56, 58, 62, 66 and ten black keys, 24, 28, 31, 36, 40, 46, 50, 54, 60 and 64. Keys 22, 24, 26, 30, 31, 32, 34, 36, 38, 40, 42, 44, 46, 48, 50, 52, 54, 56, 58, 60 and 62 have an opening or window therein, indicated as 68. As seen in FIGURE 1, all of the keys of each of the keyboards 20A through 20G have windows 68 therein, except the extreme right white key 66 and the extreme right black key 64. The key on the extreme left being the "F" key and the key on the extreme right being the "E" key.

As illustrated in FIGURE 1, panel 18 has above and to the right of keyboard panel 20A a transversely elongated opening or window 70. Above and to the right of keyboards 20B and 20C, are elongated openings 72 and 74, respectively, which are similar in size and shape as opening 70, and are vertically aligned therewith. Similarly, above and to the right of each of keyboard diagrams 20D and 20E is an elongated opening, not shown, similar in shape and size as openings 70, 72 and 74, and vertically aligned therewith. Preferably, each of these elongated openings have an identifying number adjacent thereto, preferably No. 1 referring to opening 70, No. 2 referring to opening 72, No. 3 referring to opening 74, etc., up to No. 5.

As viewed in FIGURE 1, panel 18 has in its lower right hand margin, between the edge of panel 18 and the right hand edge of keyboard diagrams 20F and 20G, a longitudinally extending opening or window 76. To the left of opening 76 and below keyboard diagram 20F is an opening or window 78 with a registry or selector line 80 interconnecting opening 78 with opening 76. To the left of opening 76 and below keyboard diagram 20G is an opening or window 82 with a registry or selector line 84 interconnecting opening 82 with opening 76.

Panel 16 is a mirror image of panel 18 and has equivalent openings or windows corresponding to openings 70, 72, 74, 76, 78 and 82 in panel 18. The openings in panel 16, which correspond to the openings in panel 18, as shown in FIGURE 3, are indicated by corresponding numbers primed.

Figure 2:
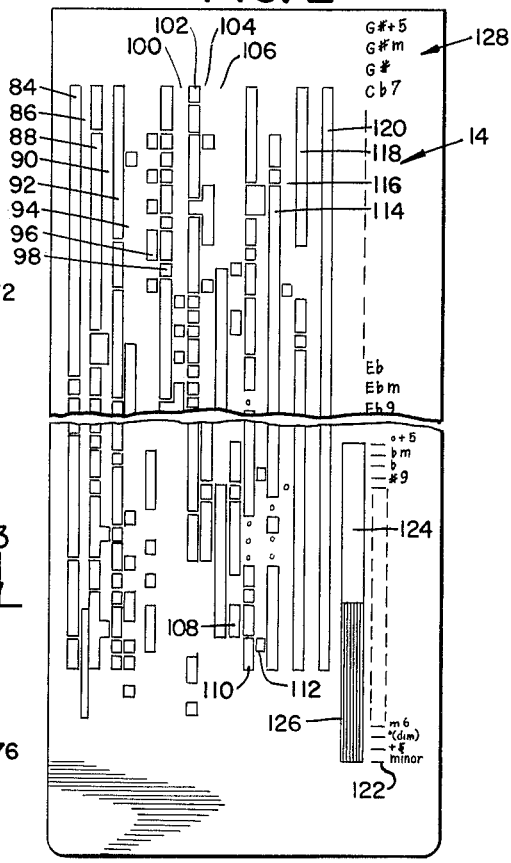
FIGURE 2 is a fragmented top plan view of one face of a slider for use in the present invention.

As shown in FIGURE 2, slide member 14 has a series of vertically oriented indicia columns 84, 86, 88, 90, 92, 94, 96, 98, 100, 102, 104, 106, 108, 110, 112, 114, 116, 118, and 120. Columns 84 through 120 are aligned on slider member 14 to correspond with predetermined openings 68 in keyboard diagrams 20A through 20G when slider 14 is slidably disposed within sheath 12 in a manner as will be discussed hereinafter. While only one face of slide member 14 is shown in FIGURE 2, the opposite face has similar vertically aligned indicia columns to align with the keyboard openings 68' on its corresponding surface of sheath 12. Disposed between the right hand edge of slide member 14, as viewed in FIGURE 2, and indicia column 120, are a series of chord symbols disposed in a vertically aligned column 122. Twenty such symbols have been found to provide an adequate number to satisfy most requirements. However, more or less may be used. Adjacent the upper group of these symbols in column 122 is a color or other common source designation, shown at 124, and adjacent the bottom group of symbols in column 122 is a different color or source designation 126. In a manner similar in location and with corresponding color or source designations is a column 122' of chord symbols on the opposite face of slide member 14. While the chord symbols were broken into two groups on each side of slider 14, more or less may be used as long as a uniform code designation is applied to each such group.

Disposed above column 122 on slide member 14, and vertically aligned therewith, are a series of chord symbols designated as 128. The chord symbols 128 are aligned to appear through openings or windows 70, 72, 74, . . ., which correspond with numbers 1, 2, 3, 4 and 5, respectively, discussed above, on panels 16 and 18.

Slide member 14 is positioned within sheath 12, so that the indicia markings of columns 122 and 122' are exposed through elongated windows 76 and 76' of sheath 12. Illustratively, 20 chord symbols appear in window 76 and 20 chord symbols appear in window 76', making a total of 40 chord symbols available. As illustrated in FIGURE 2, a group of symbols of each of columns 122 and 122', such as the upper ten, are coded uniformly in some manner, such as colored green, shown in the adjoining column 124, and the lower group of symbols, ten in the example given, are coded red in the adjoining column 126.

When slide member 14 is properly positioned within sheath 12, the desired chord symbol in column 122 is aligned with the proper registery line 80 or 84, as shown in FIGURE 1. Registry line 84 will preferably show the code markings, i.e. color as shown, of the lower group of the chord symbols in column 122, and similarly, registry line 80 will refer to the code markings of the upper group, or green code, as shown. Indicia markings appear through preselected windows 68 of the keyboard diagrams 20A through 20G corresponding to the chords aligned with registry lines 80 and 84. The coded indicia markings appearing in windows 68 indicate the position of the fingers for the corresponding chord selected in the respective musical keys "A" through "G." Since each surface of sheath 12 has corresponding longitudinal openings 76 and 76', with each opening having two registry lines 80 and 84, and 80' and 84', respectively, with different code markings, such as color, two chord fingering positions are shown in each keyboard diagram simultaneously. As mentioned above, finger placement positioning for more or less than two chords may be shown on each keyboard by the use of different coding, such as colors, symbols, letters, etc. It has been found that color coding offers quick and simple finger placement positions for the various chords, and hence a similar color appearing through windows 66 shows the corresponding positions for placing the fingers.

With the slide member 14 positioned within sheath 12 so that a predetermined chord symbol is aligned with registry line 84, there is simultaneously aligned with registry line 80 a different chord symbol. The color code corresponding to code markings 124 and 126 for the two aligned chords appear through selected windows 68 in the keys of the "A" chord keyboard diagram 20A. Thus, in keyboard diagram 20A red will be displayed in predetermined windows 68 in the keys to indicate the proper finger placement position for the "A" chord corresponding to the chord aligned with registry line 84, while simultaneously green will appear in other predetermined windows 68 in keys of diagram 20A, to indicate the proper finger placement positions for the chord aligned with registry line 80.

As illustrated in FIGURE 1, to determine the finger placement of chord A 7th, the numeral 7 in column 122 is aligned with registry line 84. The finger placement marking for chords A 7th, B 7th, etc., appear in each of the keyboard diagrams 20A through 20G simultaneously, to show the proper finger positioning for chord 7 in their respective keys. Thus the keyboard for the key of "B" indicated at 20B will have red appearing through selected windows 68 corresponding to the finger positions for the B 7th chord. Simultaneously, the finger positions for the chord numeral 9 is in the various keys in green, since numeral 9 is aligned with registry line 86. This sequence is similar in chord diagrams 20C through 20G.

In keyboard diagram 20A between keys 42 and 44 is a window 134A. Similarly, in keyboard diagram 20B through 20G appear similarly positioned windows indicated at 134B for keyboard diagram 20B, and 134F and 134G for the keyboard diagrams 20F and 20G respectively. All openings 134A to 134G are vertically aligned in each of panels 16 and 18. In windows 134A through 134G may appear a number, 1 through 5, at predetermined positions of slider 14, which numbers are also color-coded, such as printed on a green or red background. These numbers refer to windows 70, 72 and 74 adjacent the upper right hand portions of keyboard diagrams 20A through 20E, and as mentioned above, are numbered 1–5, respectively. The number appearing in openings 134A through 134G refers to one of these windows with the color relating to those musical keys showing a chord fingering position printed in the same color. This is a cross-reference to chords which are constructed with the same finger positions but of different musical keys and identified by unlike symbols, i.e. chords "A flat diminished" and "G sharp diminished" are chords played with identical finger positions with the only difference being that they are of different keys. As shown in FIGURE 1, keyboard diagram 20B shows number 1 on a red background in window 134B. In window 70, or No. 1 window, the chord Cb7 is shown. This indicates that chord Cb7 is played with the same finger positioning as the B7 chord. The operator of the device is thus advised that the B7 chord appearing in the red identifying finger positions of the keyboard diagram 20B, is also the same fingering positions for the chord Cb7. Similarly, more than one chord can appear in windows No. 1 through No. 5 with the color code designating the proper corresponding chords.

Through windows 68 of the keyboard diagrams 20A through 20G, colors appear which indicate the proper finger positions for any of the 228 chords available in the present device.

While color coding was shown as separate columns 124 and 126 adjacent indicia column 122, the color could be used as background of the indicia markings, so that only one column is used, or the symbols could be printed in different colors. Also, openings 80 and 84 could be eliminated. Similarly, while a large opening or window 76 was illustrated, a pair of smaller windows may be used showing only the chords selected. These windows could eliminate registry lines 84 and 86, by only showing a single chord listed.

Further, sheath 12 could be made of opaque material and have transparent sections corresponding to the openings and windows described herein.

As many changes could be made in the above construction and many apparently widely different embodiments of the invention could be made without departing from the scope thereof, it is intended that all matter contained in above description and shown in the accompanying drawings, shall be interpreted as illustrative only and not in a limiting sense.

What is claimed is:

1. A music teaching device, comprising first and second panels, each of said panels having a plurality of vertically aligned keyboard representations thereon and having windows associated with at least some of the keys of each of said representations, each panel having a margin adjacent said keyboard representations and having a selector index window therein, a slider disposed between said panels and slidable therebetween, said slider having a plurality of vertically aligned indicia markings for display through corresponding windows in said keys, said slider further having a plurality of chord designations vertically aligned for selectable registering with a corresponding selector index window in each panel, said chord designations being movable into registry with said selector index window upon longitudinal movement of said slider, said indicia columns and said chord and note designations being operatively positioned so that said indicia markings appear in selected windows in said keys of said plurality of keyboard representations to properly determine the chord corresponding to selected chord designations then appearing in said selector window to thereby indicate the keys to be struck to produce the chords desired.

2. A music teaching device in accordance with claim 1 in which each of said panels has a window adjacent selected ones of said keyboard representations, chord designations on said slider for appearing simultaneously in said windows, said designations corresponding to the selected chord appearing in said selector window, a group of number designations on said slider for appearing in windows of selected keyboard representations to provide means for identifying the chord appearing in one of said first-mentioned windows which use the same finger positions shown on said corresponding keyboard but are of a different musical key and a different symbol.

3. Apparatus for self-teaching purposes comprising a panel having a pair of surfaces with one surface provided with a plurality of vertically aligned keyboard representations thereon, each of said keyboard representations having a plurality of key representations, selected keys of each of said keyboard representations having a window therein, said panel having an elongated index window adjacent a longitudinal edge, a slider movable longitudinally with respect to said panel and adjacent the other surface of said panel, said slider having a plurality of chord designations in a vertical column so as to be selectively movable into registry with said elongated index window in said panel, said slider further having a plurality of columns of indicia markings movable into registery with said windows in selected ones of said keys corresponding to the particular chord designation aligned in said elongated window, said indicia markings appearing in said selected key windows to thereby indicate the keys to be struck for the noted chords.

4. A music teaching device in accordance with claim 3 in which said panel has a window adjacent selected keyboard representations, chord designations on said slider for appearing simultaneously in said windows corresponding to the selected chord appearing in said selector window, a group of number designations on said slider for appearing in selected keyboard windows to provide means for identifying the chord appearing in one of said first-mentioned windows which use the same finger positions shown on said corresponding keyboard, but are of a different musical key and a different symbol.

5. Apparatus for self-teaching purposes comprising a panel provided with a plurality of vertically aligned keyboard representations thereon, each of said representations having a plurality of keys, selected representations of each of said keyboards having a window therein, said panel having a plurality of selector and index windows, a slider cooperatively movable longitudinally with respect to said panel, said slider having a plurality of chord designations in a longitudinal column so as to be selectively movable into registry with said selector and index window, said chord designations being color-coded in predetermined relationship, said slider further having a plurality of longitudinally oriented columns of color-coded indicia markings movable into registry with said windows in selected ones of said keys corresponding to the particular chord designations aligned in said selector and index windows, said color-coded indicia markings appearing in said key windows to thereby indicate the keys to be struck to produce chords represented in the same color and appearing in said selector window.

References Cited by the Examiner
UNITED STATES PATENTS

| | | | |
|---|---|---|---|
| 605,157 | 6/1898 | Wickersham | 84—473 |
| 1,017,045 | 2/1912 | French et al. | 84—480 |
| 2,001,191 | 5/1935 | Golden | 84—485 |
| 2,332,842 | 10/1943 | Champion | 84—473 |
| 2,497,364 | 2/1950 | Mayberry | 84—473 |
| 2,657,610 | 11/1953 | Carran | 84—480 |
| 2,832,252 | 4/1958 | Gabriel | 84—380 |

FOREIGN PATENTS

| | | |
|---|---|---|
| 118,630 | 6/1944 | Australia. |
| 367,633 | 7/1906 | France. |
| 250,644 | 9/1912 | Germany. |
| 18,774 | 1892 | Great Britain. |
| 136,874 | 12/1919 | Great Britain. |

LEO SMILOW, *Primary Examiner.*